(12) United States Patent
Kobayashi et al.

(10) Patent No.: US 8,070,102 B2
(45) Date of Patent: Dec. 6, 2011

(54) SLIDE DOOR DEVICE FOR AIRCRAFT (75) Inventors: Masaki Kobayashi, Saitama (JP);
Hiroshi Yamanouchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 12/533,822

(22) Filed: Jul. 31, 2009

(65) Prior Publication Data
US 2010/0059628 A1 Mar. 11, 2010

(30) Foreign Application Priority Data
Aug. 1, 2008 (JP) ................. 2008-199836

(51) Int. Cl.
*B64C 1/14* (2006.01)
(52) U.S. Cl. .............. 244/129.5; 244/129.4; 49/360; 49/208; 49/213; 49/216
(58) Field of Classification Search ........... 244/129.4, 244/129.5; 49/360, 209, 213, 216
See application file for complete search history.

(56) References Cited

U.S. PATENT DOCUMENTS

| | | | | |
|---|---|---|---|---|
| 2,378,856 A * | 6/1945 | Laddon et al. | ................ | 160/209 |
| 3,131,892 A * | 5/1964 | Salmun | ................ | 244/129.5 |
| 3,728,819 A * | 4/1973 | Goldbach et al. | ................ | 49/216 |
| 4,157,846 A * | 6/1979 | Whitcroft | ................ | 296/155 |
| 5,832,668 A * | 11/1998 | Faubert et al. | ................ | 49/215 |
| 6,189,833 B1 * | 2/2001 | Ambrose et al. | ................ | 244/129.5 |
| 6,328,374 B1 * | 12/2001 | Patel | ................ | 296/155 |
| 7,290,736 B2 * | 11/2007 | Pahl | ................ | 244/129.5 |

FOREIGN PATENT DOCUMENTS

JP  2005-178770 A  7/2005
* cited by examiner

*Primary Examiner* — Timothy D Collins
*Assistant Examiner* — Michael A Fabula
(74) *Attorney, Agent, or Firm* — Birch, Stewart, Kolasch & Birch, LLP (57) ABSTRACT

A slide door device for an aircraft includes an upper guide roller at a tip end of an upper arm provided at an upper part of a slide door and a lower guide roller at a tip end of a lower arm provided at a lower part of the slide door that are rollably engaged with an upper guide rail and a lower guide rail that are fixed along an upper edge and a lower edge of a door opening frame formed in a fuselage of an aircraft, respectively. An intermediate guide roller, provided at a tip end of an intermediate arm provided in a door opening, is rollably engaged with an intermediate guide rail that is fixed to an inner surface of the slide door, while smoothly guiding the slide door with the upper guide rail, the lower guide rail, and the intermediate guide rail.

20 Claims, 11 Drawing Sheets

FIG.8(A)
WHEN DOOR IS
FULLY CLOSED

FIG.8(B)
WHEN DOOR
PROTRUDES

FIG.8(C)
WHEN DOOR
PROTRUDES FULLY
(WHEN SLIDING STARTS)

FIG.9(A)
AT INITIAL STAGE
OF DOOR SLIDING

FIG.9(B)
WHEN DOOR
IS SLIDING

FIG.9(C)
WHEN DOOR IS
FULLY OPEN

FIG.10(A) WHEN DOOR IS FULLY CLOSED

FIG.10(B) WHEN DOOR PROTRUDES

FIG.10(C) WHEN DOOR PROTRUDES FULLY (WHEN SLIDING STARTS)

FIG.10(D) AT INITIAL STAGE OF DOOR SLIDING

FIG.10(E) WHEN DOOR IS SLIDING

FIG.10(F) WHEN DOOR IS FULLY OPEN

FIG.11

SLIDE DOOR DEVICE FOR AIRCRAFT

CROSS-REFERENCE TO RELATED APPLICATIONS

The present application claims priority under 35 USC 119 to Japanese Patent Application No. 2008-199836 filed on Aug. 1, 2008 the entire contents of which are hereby incorporated by reference.

BACKGROUND OF THE INVENTION

1. Field of the Invention

The present invention relates to a slide door device that opens and closes a door opening formed in a fuselage of an aircraft.

2. Description of the Related Art

In order to guide a slide door that opens/closes a door opening of a cargo compartment provided inside the fuselage of an aircraft, a known slide door device, as disclosed in Japanese Patent Application Laid-open No. 2005-178770, includes an upper guide rail provided along an upper edge of the door opening, a lower guide rail provided along a lower edge of the door opening with a center guide rail provided along an outer surface of the fuselage. This type of slide door device causes a slide door that protrudes to the outside of the aircraft body to slide along the outer surface of the fuselage along the three guide rails.

However, according to the aforementioned conventional slide door device, since guide rails are provided along the outer surface of the fuselage, not only is there a problem that air resistance is increased by the guide rails, but also there is a possibility that it may not be possible to perform a smooth opening and closing of the slide door due to freezing or the like of the guide rails.

SUMMARY OF THE INVENTION

An embodiment of the present invention has been made in view of the above described circumstances. An object of an embodiment of the invention is to eliminate guide rails that guide the sliding of a slide door from an outer surface of a fuselage, to thereby reduce air resistance and improve reliability.

In order to achieve the object, according to an embodiment of the present invention, there is provided a slide door device for an aircraft for opening and closing a door opening formed in a fuselage of an aircraft. An upper guide roller at a tip end of an upper arm, provided at an upper part of a slide door, and a lower guide roller at a tip end of a lower arm, provided at a lower part of the slide door, are rollably engaged with an upper guide rail and a lower guide rail that are fixed along an upper edge and a lower edge of the door opening, respectively. An intermediate guide roller, provided at a tip end of an intermediate arm provided in the door opening, is rollably engaged with an intermediate guide rail that is fixed to an inner surface of the slide door.

The upper guide roller at the tip end of the upper arm provided at the upper part of the slide door and the lower guide roller at the tip end of the lower arm provided at the lower part of the slide door are rollably engaged with the upper guide rail and the lower guide rail that are fixed along the upper edge and the lower edge of the door opening formed in the fuselage of an aircraft, respectively. The intermediate guide roller that is provided at the tip end of the intermediate arm provided in the door opening is rollably engaged with the intermediate guide rail that is fixed to the inner surface of the slide door. Accordingly, while smoothly guiding the slide door with the upper guide rail, the lower guide rail, and the intermediate guide rail, the intermediate guide rail is not exposed on an outer surface of a fuselage. Thus, an increase in air resistance and a decrease in reliability can be prevented.

According to an embodiment, one of the upper guide rail and the lower guide rail is defined as a main guide rail and another of the upper guide rail and the lower guide rail is defined as an auxiliary guide rail. A virtual guide rail that is obtained by parallelly shifting the main guide rail in an up-and-down direction is defined as a virtual guide rail. A slider is pivotally supported through a spindle part at a tip end of an arm which is for the auxiliary guide rail, and a plurality of guide rollers provided in the slider are rollably engaged with the auxiliary guide rail. A shape of the auxiliary guide rail is set so that, when the plurality of guide rollers provided in the slider are rolled along the auxiliary guide rail, a movement trajectory of the spindle part of the slider matches the virtual guide rail.

With this configuration, one of the upper guide rail and the lower guide rail is defined as the main guide rail and another of the upper guide rail and the lower guide rail is defined as the auxiliary guide rail, and the virtual guide rail obtained by parallelly shifting the main guide rail in the up-and-down direction is defined as the virtual guide rail. The slider is pivotally supported through the spindle part at the tip end of the arm which is for the auxiliary guide rail, and the plurality of guide rollers provided in the slider are rollably engaged with the auxiliary guide rail. A shape of the auxiliary guide rail is set so that, when the plurality of guide rollers provided in the slider are rolled along the auxiliary guide rail, a movement trajectory of the spindle part of the slider matches the virtual guide rail. Accordingly, the slide door is guided by the main guide rail and the virtual guide rail that are substantially the same shape and are in a positional relationship in which they have been shifted in parallel to each other. Thus, the slide door can open and close smoothly. The shape of the auxiliary guide rail that actually guides the slider of the slide door instead of the virtual guide rail can be made a different shape to the virtual guide rail in accordance with the shape of a slider, i.e. the positional relationship between the plurality of guide rollers and the spindle part. Therefore, even in a case in which the virtual guide rail projects outwardly from the outer surface of the fuselage, the auxiliary guide rail can be disposed so as not to project outward from the outer surface of the fuselage, to thereby enable a smooth opening and closing of the slide door while preventing an increase in air resistance and a decrease in reliability.

According to an embodiment of the present invention, at least one of the upper arm, the lower arm, and the intermediate arm comprises a first guide roller that is rotatably supported around a vertical shaft and a second guide roller that is rotatably supported around a horizontal shaft with the movement of the slide door being guided by the first guide roller. The weight of the slide door is supported by the second guide roller. The guide rail which is for said at least one of the arms comprises, as two upper and lower tiers, a first groove part in which the first guide roller fits and a second groove part in which the second guide roller fits.

With this configuration, the first guide roller that is rotatably supported around the vertical shaft and guides movement of the slide door, and the second guide roller that is rotatably supported around the horizontal shaft and supports the weight of the slide door are provided on at least one of the upper arm, the lower arm, and the intermediate arm. The first groove part in which the first guide roller fits and the second groove part in which the second guide roller fits are provided on the corresponding guide rail as two upper and lower tiers. Accordingly, it is possible to both guide and also support the weight of the slide door while employing a compact structure.

An upper guide rail 19 of an embodiment corresponds to the main guide rail with a lower guide rail 20 corresponding to the auxiliary guide rail or guide rail of the present invention. A ball joint 45 of the embodiment corresponds to the spindle part with a pin 47 of the embodiment corresponding to the vertical shaft of the present invention. A first lower guide roller 48 of the embodiment corresponds to the first guide roller, lower guide roller or guide roller with a pin 49 of the embodiment corresponding to the horizontal shaft of the present invention. A second lower guide roller 50 of the embodiment corresponds to the second guide roller, lower guide roller or guide roller of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
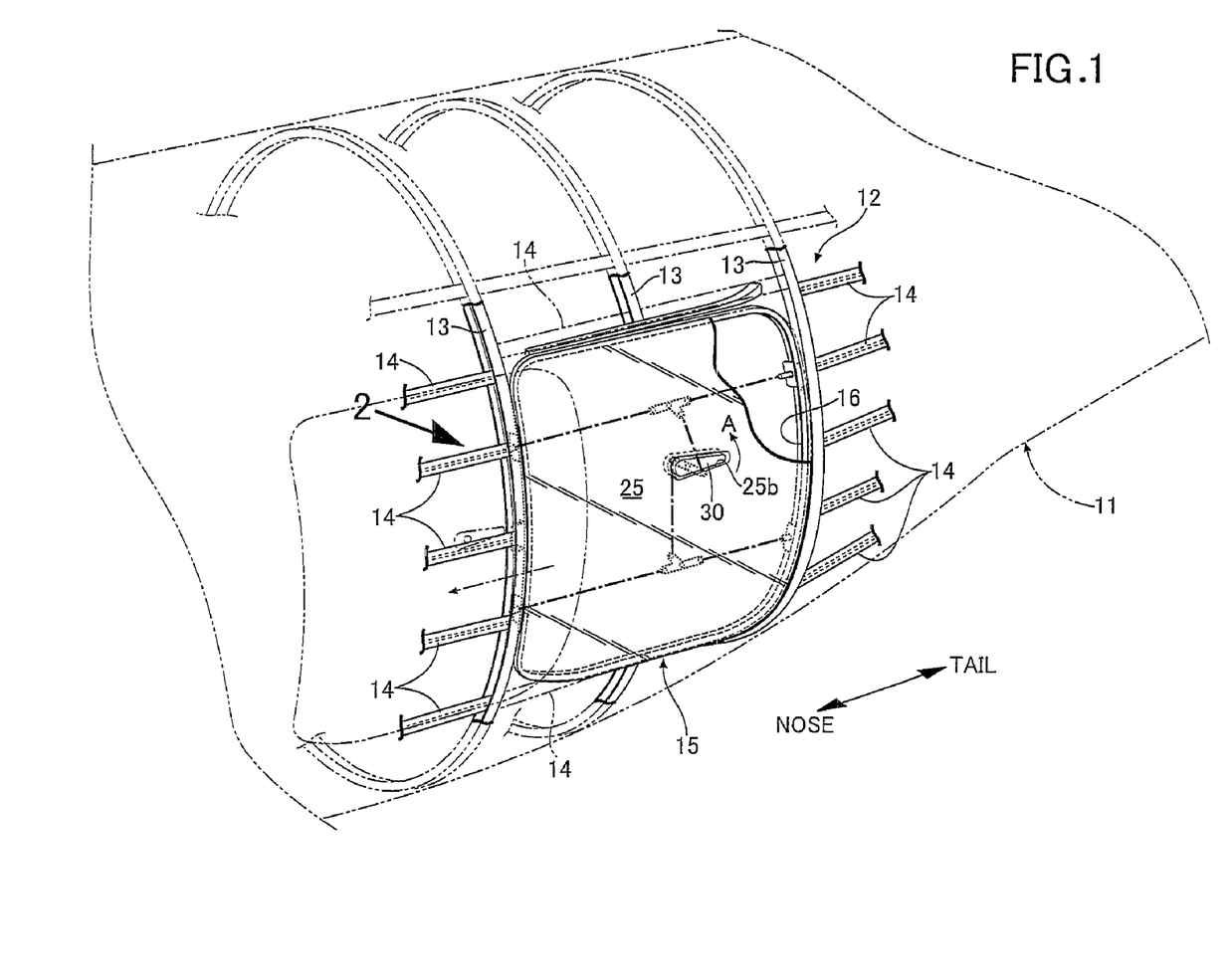
FIG. 1 is a perspective view of a left side surface of a rear fuselage of an airplane.

As illustrated in FIG. 1, a frame 12 of a rear fuselage 11 of an airplane is constructed by combining a plurality of ring frames 13 that form an annular shape that are disposed at predetermined intervals in the longitudinal direction with a plurality of stringers 14 that extend substantially linearly in a longitudinal direction. A door opening 16 of a slide door 15 that opens and closes an internal cargo compartment of the fuselage 11 is formed by cutting out a section of one ring frame 13 and three stringers 14 within an area that is enclosed by three of the ring frames 13 and five of the stringers 14. The plurality of ring frames 13 decrease in diameter in accordance with the closeness thereof to the tail. Accordingly, the surface shape of the fuselage 11 is not the shape of a cylindrical surface, but is the shape of a three-dimensional curved surface that is near to a conical surface.

Figure 2:
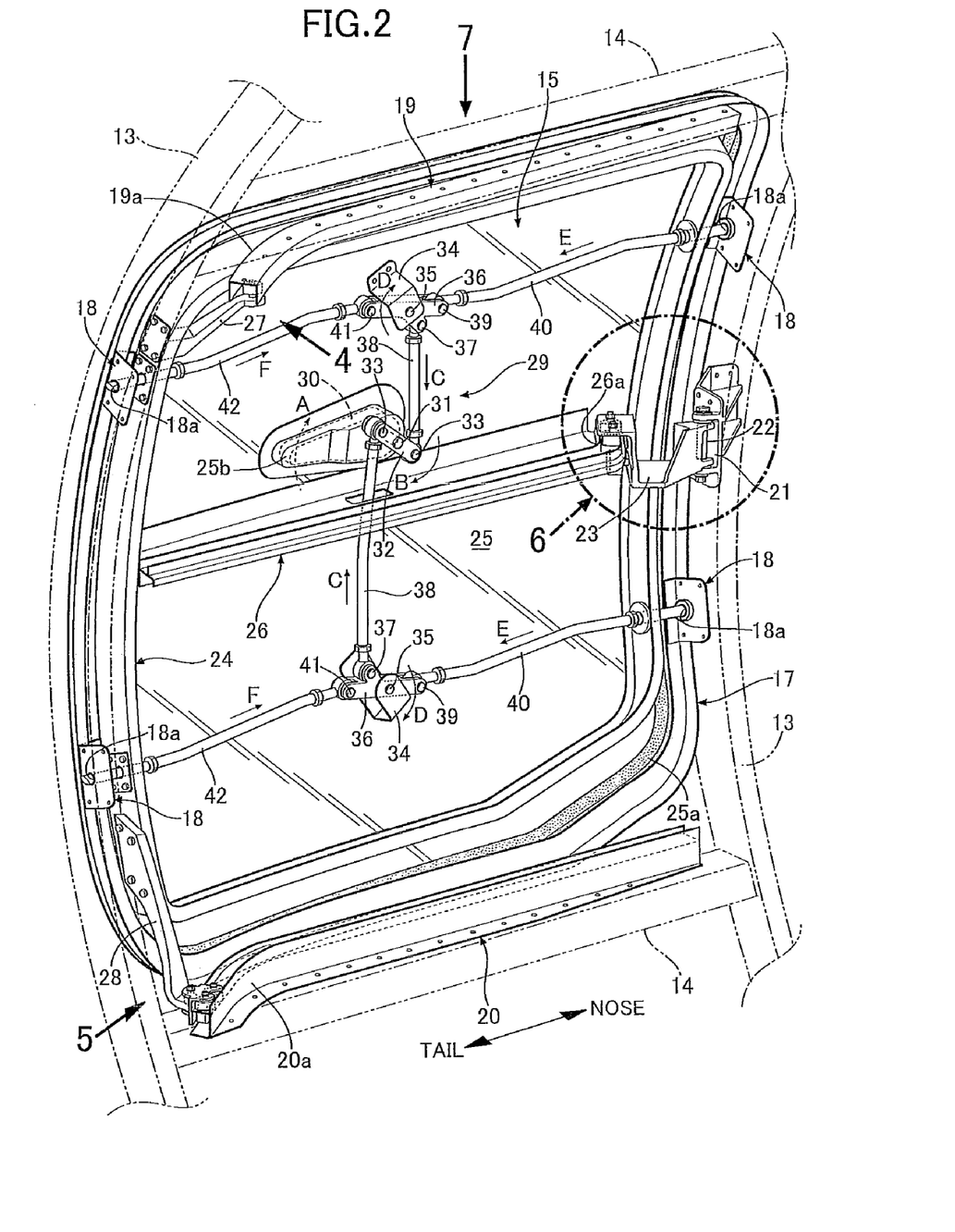
FIG. 2 is a view from a direction of an arrow 2 in FIG. 1 (a perspective view of inner surface of a slide door)
Figure 3:
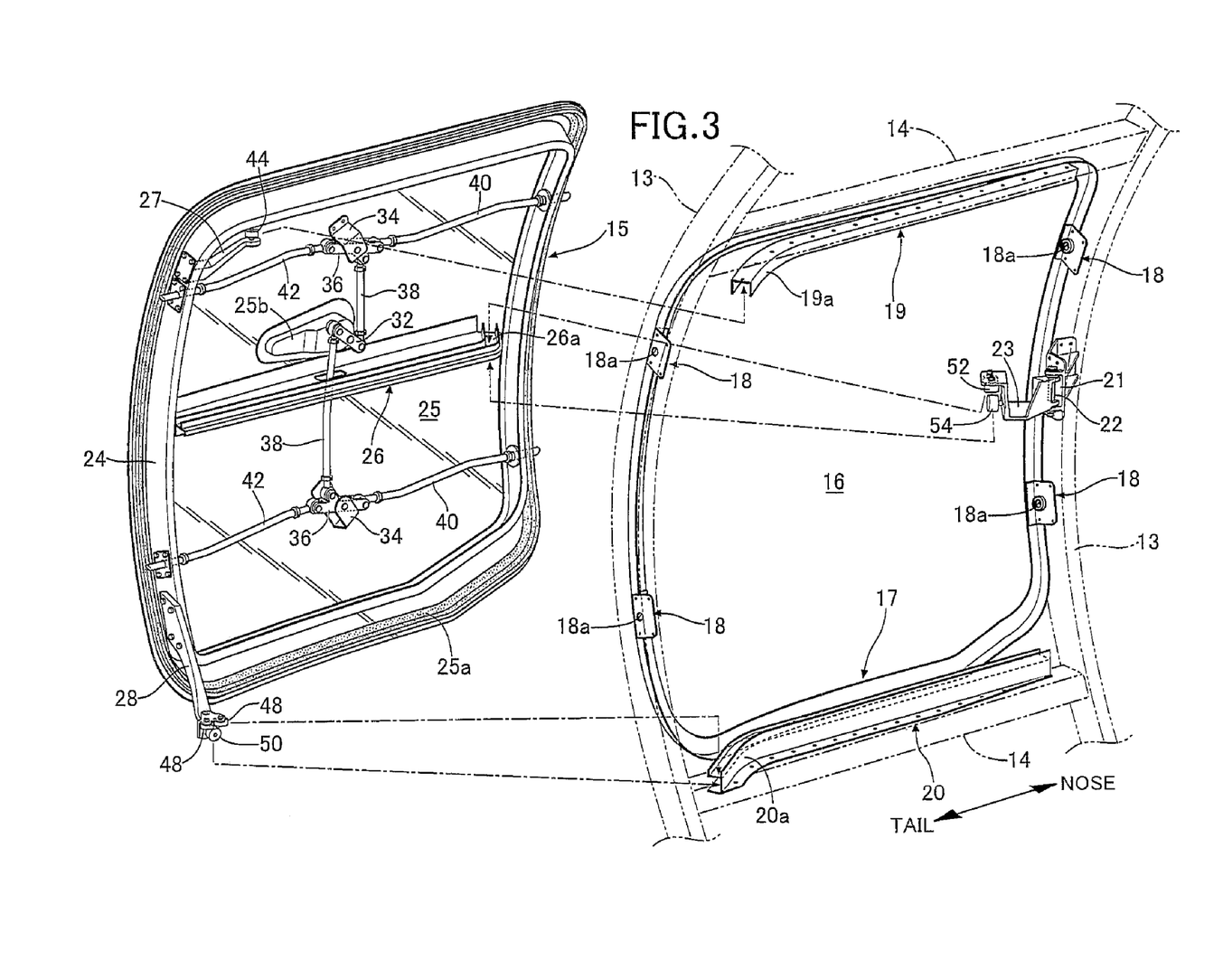
FIG. 3 is a perspective view showing a state where the slide door is separated from a door opening in FIG. 2.

As clearly illustrated in FIG. 2 and FIG. 3, a quadrangular door opening frame 17 with rounded corners is fixed to two ring frames 13 and 13 via four brackets 18 in the door opening 16 that is enclosed by two ring frames 13 and 13 and two stringers 14 and 14. An upper guide rail 19 is fixed to the stringer 14 on the upper side so as to be arranged along the upper edge of the door opening frame 17. A lower guide rail 20 is fixed to the stringer 14 on the lower side so as to be arranged along the lower edge of the door opening frame 17. The upper guide rail 19 and the lower guide rail 20 are disposed at positions that are further on the aircraft-interior-side than the door opening frame 17 so as not to be exposed to the exterior of the fuselage 11. Curve parts 19a and 20a that curve to the aircraft-interior-side are formed at the ends on the tail side of the upper guide rail 19 and the lower guide rail 20, respectively. A bracket 21 is fixed to the ring frame 13 along an edge on the nose side of the door opening frame 17. The base end of an intermediate arm 23 is pivotally supported through a pin 22 that extends in the up-and-down direction at the bracket 21.

The slide door 15 includes a door frame 24 that is substantially the same shape as the door opening frame 17, a door skin 25 that covers the outer surface of the door frame 24, and an intermediate guide rail 26 that is fixed in the longitudinal direction to an inner surface of the door skin 25 and that guides the tip end of the intermediate arm 23. In a state in which the slide door 15 is closed, the door skin 25 and the skin of the fuselage 11 run together smoothly, and a seal member 25a provided on the inner surface of an outer peripheral portion of the door skin 25 abuts against the door opening frame 17. The base end of an upper arm 27 is fixed to an upper end on the tail side of the door frame 24. The tip end of the upper arm 27 is guided by the upper guide rail 19. The base end of a lower arm 28 is fixed to a lower end on the tail side of the door frame 24. The tip end of the lower arm 28 is guided by the lower guide rail 20. A curve part 26a that curves towards the aircraft-exterior-side is formed at an end portion on the nose side of the intermediate guide rail 26.

A lock mechanism 29 for locking the slide door 15 in a closed position is provided on the inner surface of the slide door 15. More specifically, a lever 30 (see FIG. 1) is housed in a concave portion 25b formed in the center of the door skin 25 of the slide door 15, and a pin 33 provided at one end of a drive arm 32 having an intermediate part fixed to a spindle 31 that pivotally supports the lever 30, and a pin 37 provided at a first end of a follow arm 36 that is pivotally supported by a pin 35 in a bracket 34 provided at an upper part of the door skin 25 are pivotally supported at opposite ends of a first link 38. A second link 40 that is pivotally supported at one end through a pin 39 by a second end of the follow arm 36 extends to the nose side, and passes through the door frame 24 in a slidable condition to fit into a pinhole 18a of the bracket 18 of the door opening frame 17. Similarly, a third link 42 that is pivotally supported at one end through a pin 41 provided at a third end of the follow arm 36 extends to the tail side, and passes through the door frame 24 in a slidable condition to fit into a pinhole 18a of the bracket 18 of the door opening frame 17.

The configuration of the upper half-part of the lock mechanism 29 has been explained so far, and the configuration of the lower half-part of the lock mechanism 29 is substantially the same as the above-described configuration of the upper half-part, thereby reference numerals the same as those of the upper half-part are denoted in FIGS. 2 and 3 and an overlapping explanation is omitted.

Figure 4:
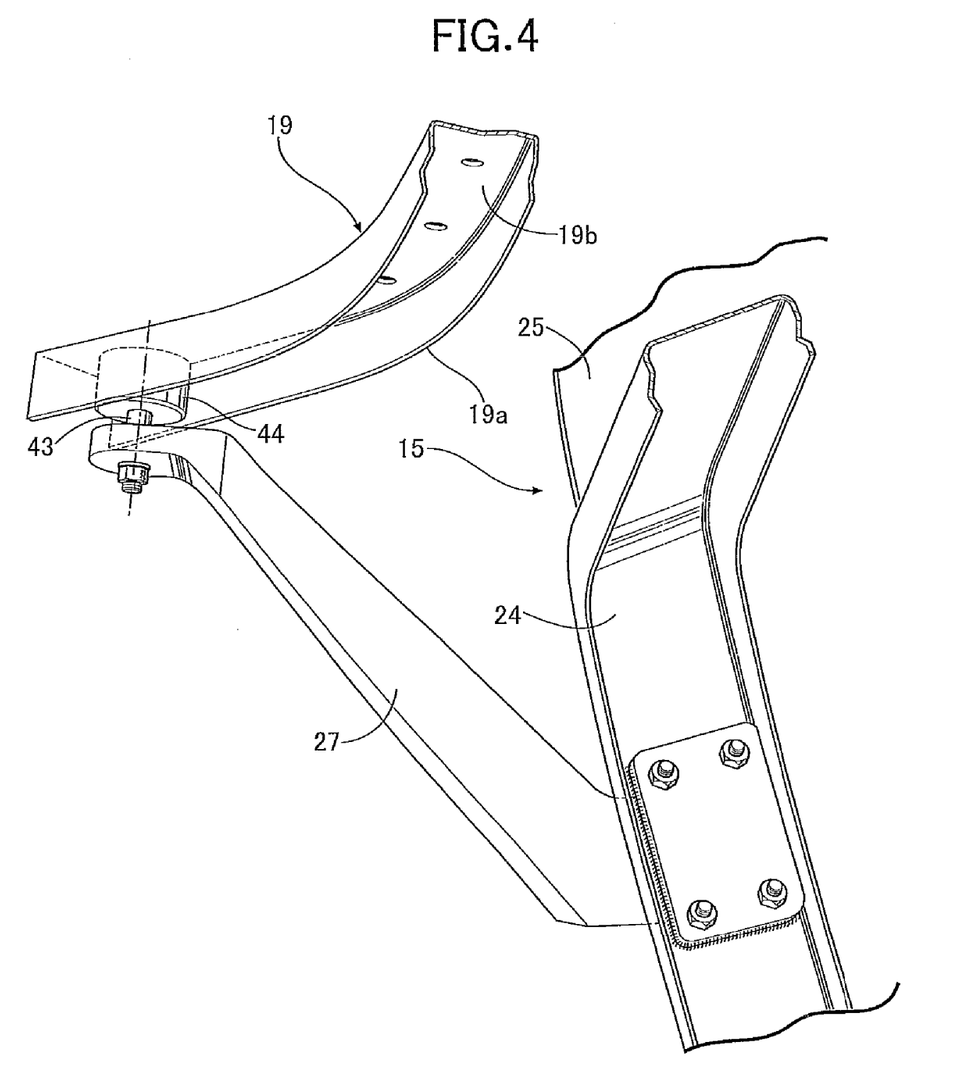
FIG. 4 is an enlarged view from an arrow 4 in FIG. 2.

As illustrated in FIG. 2 and FIG. 4, the upper guide rail 19 has a groove-shaped cross-section in which the bottom surface is open. An upper guide roller 44 that is rotatably supported through a pin 43 extending in the up-and-down direction at the tip end of the upper arm 27 that extends from the door frame 24 fits into and is guided by the upper guide rail 19.

Figure 5:
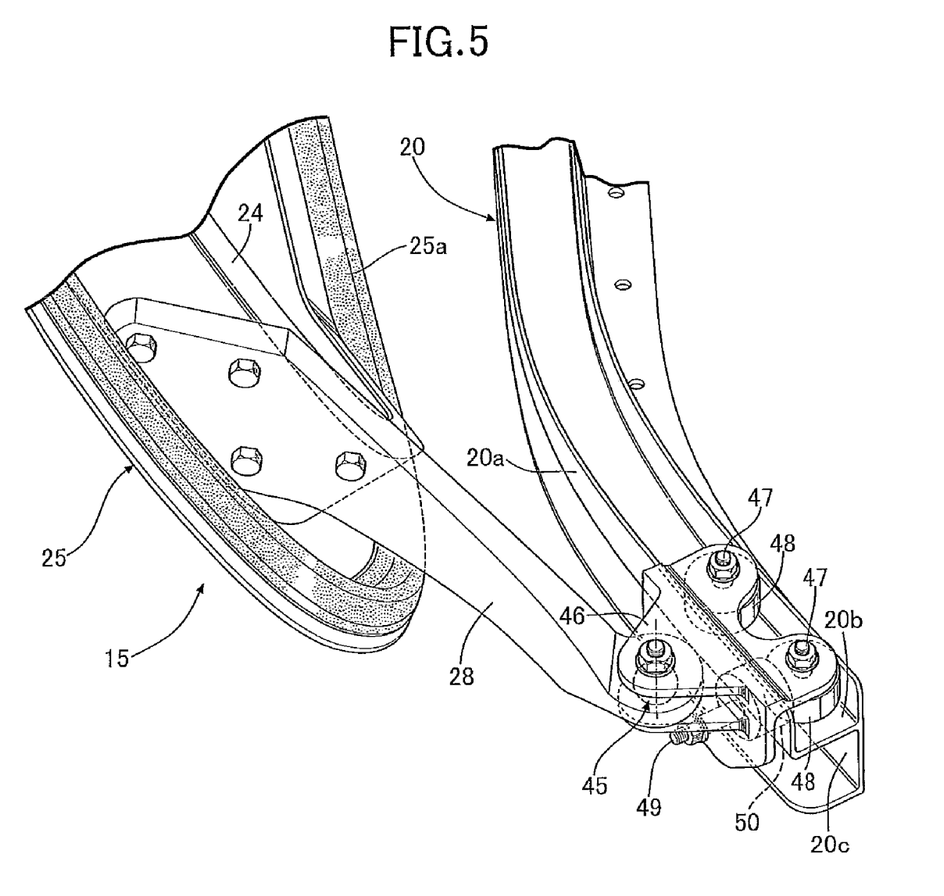
FIG. 5 is an enlarged view from an arrow 5 in FIG. 2.

As clearly illustrated in FIG. 2 and FIG. 5, the lower guide rail 20 includes, as two upper and lower tiers, a first groove part 20b in which the top surface is open and a second groove part 20c in which the side surface is open. A slider 46 is swingably supported through a ball joint 45 at the tip end of the lower arm 28 that extends from the door frame 24. Two first lower guide rollers 48 and 48 that are rotatably supported through two pins 47 and 47 extending in the up-and-down direction in the slider 46 fit in the first groove part 20b. A second lower guide roller 50 that is rotatably supported through a pin 49 extending in the horizontal direction in the slider 46 fits in the second groove part 20c.

Figure 6:
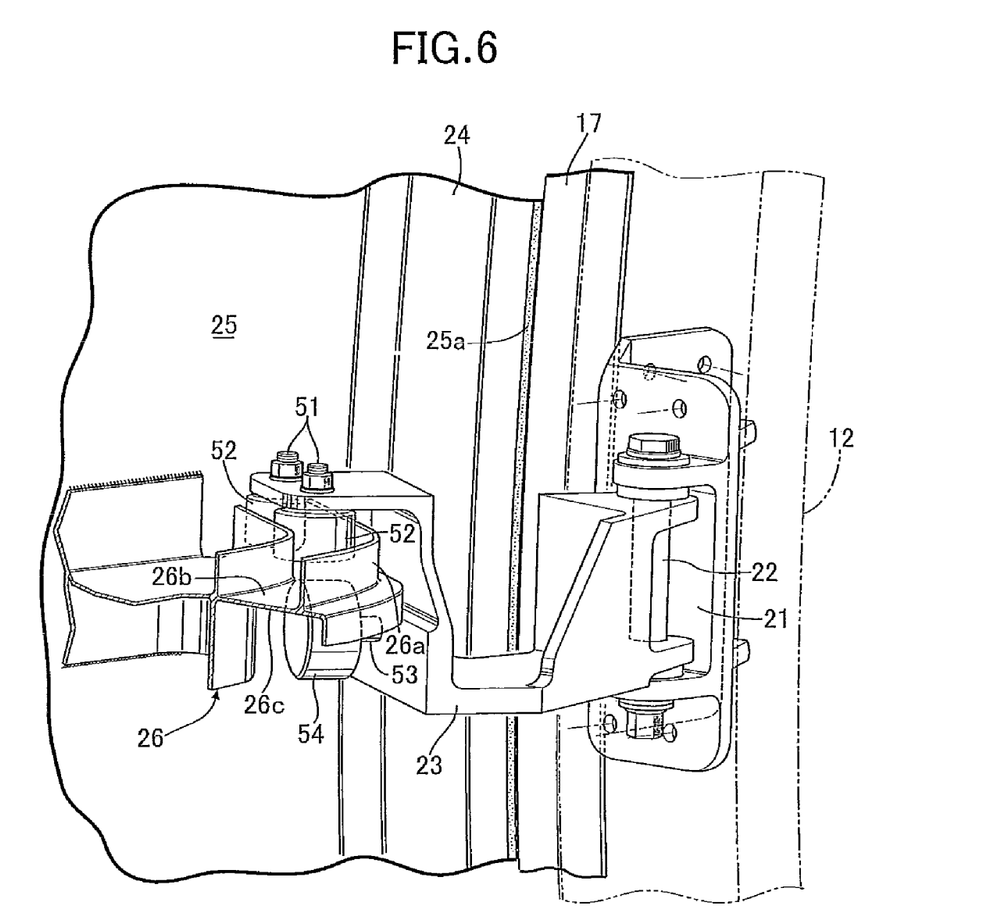
FIG. 6 is an enlarged view of a part 6 in FIG. 2.

As clearly illustrated in FIG. 2 and FIG. 6, the intermediate guide rail 26 provided on the slide door 15 side includes, as two upper and lower tiers, a first groove part 26b in which the top surface is open and a second groove part 26c in which the bottom surface is open. The intermediate arm 23 whose base end is pivotally supported through the pin 22 extending in the up-and-down direction at the bracket 21 fixed to the ring frame 13 on the nose side includes two first intermediate guide rollers 52 and 52 that are rotatably supported through two pins 51 and 51 extending in the up-and-down direction at the tip end thereof, and a second intermediate guide roller 54 that is rotatably supported through a pin 53 that extends in the horizontal direction. The two first intermediate guide rollers 52 and 52 fit in the first groove part 26b of the intermediate guide rail 26, and the single second intermediate guide roller 54 fits in the second groove part 26c of the intermediate guide rail 26.

Next, an operation of the embodiment of the present invention having the above-described configuration will be described.

Operations to open/close the slide door 15 are performed from the outside of the aircraft. To open the slide door 15, with respect to the illustration shown in FIG. 1, an operator pulls out the lever 30 that is housed in the concave portion 25b of the door skin 25 of the slide door 15 and operates the lever 30 in an upward direction (arrow A direction). As a result, in the illustration shown in FIG. 2, the drive arm 32 swings in the arrow B direction around the spindle 31, and the upper and lower first links 38 and 38 are drawn in the arrow C direction. Thereupon, the follow arms 36 and 36 swing in the arrow D direction around the pins 35 and 35 and the two second links 40 and 40 are drawn in the arrow E direction. As a result, the tip ends of the two second links 40 and 40 are pulled out from the pinholes 18a and 18a of the brackets 18 and 18 of the door opening frame 17, and the two third links 43 and 43 are drawn in the arrow F direction, and the tip ends of the two third links 43 and 43 are pulled out from the pinholes 18a and 18a of the brackets 18 and 18 of the door opening frame 17 to thereby release the lock of the slide door 15 with respect to the door opening frame 17.

In this connection, when locking the slide door 15 with respect to the door opening frame 17, it is sufficient to operate the lever 30 in the opposite direction (opposite direction to that of the arrow A) to cause the tip ends of the two second links 40 and 40 and the two third links 42 and 42 to fit into the pinholes 18a of the brackets 18 of the door opening frame 17.

After releasing the lock of the slide door 15 as described above, when the operator grasps the lever 30 and pulls the lever 30 to the nose side, as shown in FIG. 8(A) to FIG. 10(F), the upper guide roller 44 at the tip end of the upper arm 27 on the slide door 15 side is guided by a groove part 19b of the upper guide rail 19, and the two first lower guide rollers 48 and 48 at the tip end of the lower arm 28 are guided by the first groove part 20b of the lower guide rail 20. Further, the single second lower guide roller 50 is guided by the second groove part 20c of the lower guide rail 20, and the two first intermediate guide rollers 52 and 52 at the tip end of the intermediate arm 23 on the door opening frame 17 side are guided by the first groove part 26b of the intermediate guide rail 26. Furthermore, the single second intermediate guide roller 54 is guided by the second groove part 26c of the intermediate guide rail 26, to thereby open the slide door 15.

At this time, in the initial stage of the opening operation the upper arm 27 and the lower arm 28 on the slide door 15 side are guided by the curve part 19a on the tail-side end of the upper guide rail 19 and the curve part 20a on the tail-side end of the lower guide rail 20. Further, the intermediate arm 23 on the door opening frame 17 side is guided by the curve part 26a on the nose-side end of the intermediate guide rail 26. As a result, the slide door 15 can protrude to the outside of the aircraft side while moving in a parallel manner from the door opening 16. Accordingly, when sliding the slide door to the nose side from that state, the slide door 15 moves along the outer surface side of the outer face of the fuselage 11. Thus, interference with the fuselage 11 is avoided.

When the slide door 15 is separated from the door opening frame 17, the weight thereof is supported by the door opening frame 17 side (see FIG. 5). This is because the second lower guide roller 50 of the lower arm 28 on the slide door 15 side abuts against the second groove part 20c of the lower guide rail 20 on the fuselage 11 side, and the second intermediate guide roller 54 of the intermediate arm 23 on the fuselage 11 side abuts against the second groove part 26c of the intermediate guide rail 26 of the slide door 15 side. The other guide rollers 44, 48 and 48, and 52 and 52 have a function to guide movement of the slide door 15, and do not have a function to support the weight of the slide door 15.

As described above, since the intermediate guide rail 26 that guides an intermediate part in the up-and-down direction of the slide door 15 is provided not on the outer surface of the fuselage 11 but on the inner surface of the slide door 15, it is possible to prevent the intermediate guide rail 26 from being exposed on the outer surface of the fuselage 11 and thereby causing an increase in air resistance and a decrease in reliability.

Since the first lower guide rollers 48 and 48 that guide the movement of the slide door 15, and the second lower guide roller 50 that supports the weight of the slide door 15 are provided on the lower arm 28, and the first groove part 20b in which the first lower guide rollers 48 and 48 fit and the second groove part 20c in which the second lower guide roller 50 fits are provided as two upper and lower tiers in the lower guide rail 20, it is possible to both guide and also support the weight of the slide door 15 while employing a compact structure.

As clearly illustrated in FIG. 1, the sectional shape of the fuselage 11 in the vicinity of the slide door 15 changes so as to gradually narrow towards the tail side from the nose side, and the door opening 16 is biased in the downward direction from the center in the height direction of the fuselage 11. Thus, the shape of a line of the upper edge of the door opening 16 and the shape of a line of the lower edge thereof do not match. Accordingly, if the shape of the upper guide rail 19 is decided so as to follow along the upper edge line of the door opening 16 and the shape of the lower guide rail 20 is decided so as to follow along the lower edge line, the slide door 15 that has a three-dimensional curved surface shape will be locked in an immovable state during sliding and will no longer be able to open and close smoothly.

Figure 7:
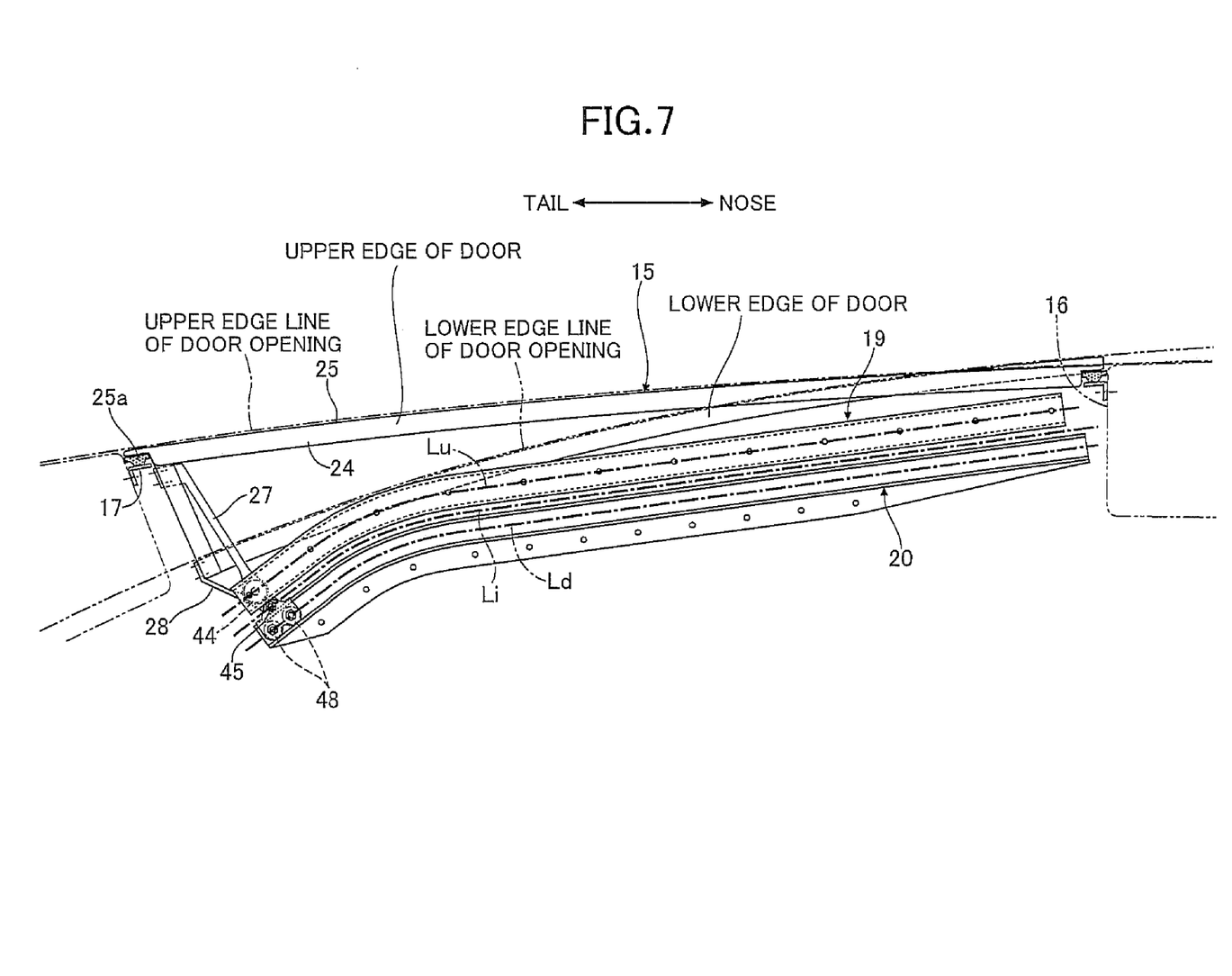
FIG. 7 is a view from a direction of an arrow 7 in FIG. 2.
Figure 8A:
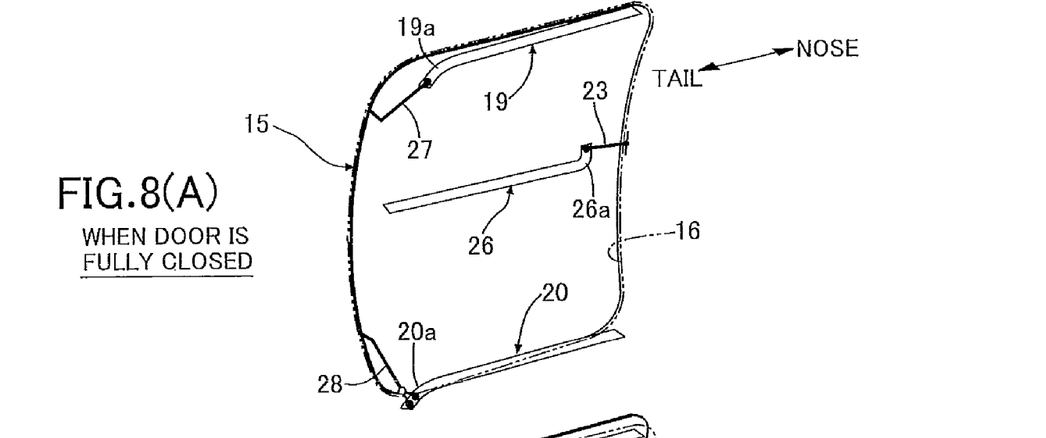
FIGS. 8(A) to 8(C) are views explaining the opening steps of the slide door (Part 1)
Figure 8B:
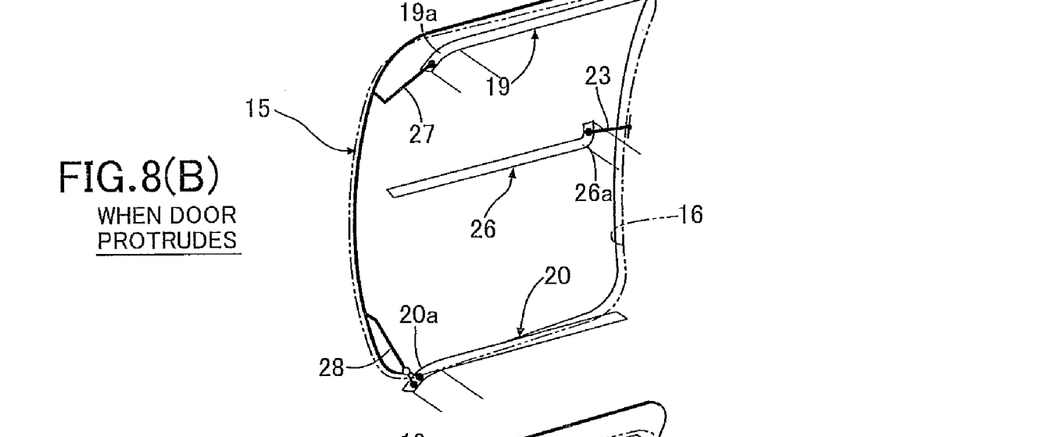
Figure 8C:
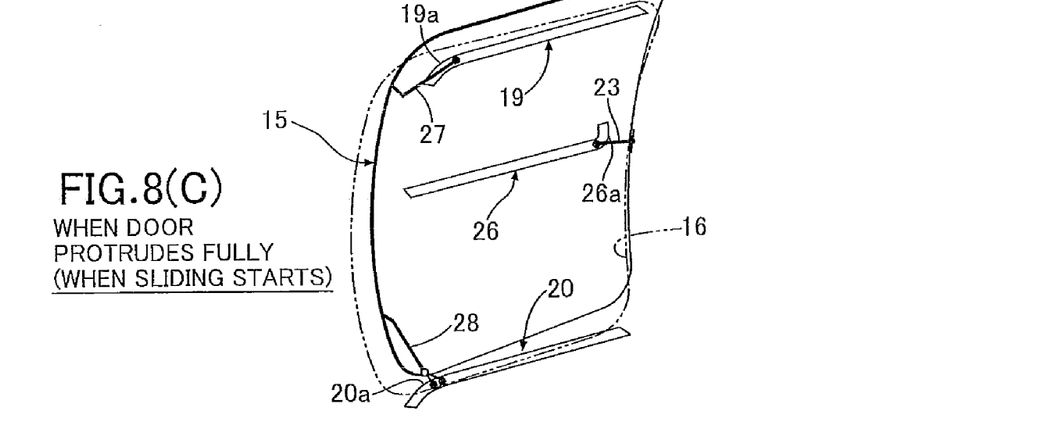
Figure 9A:
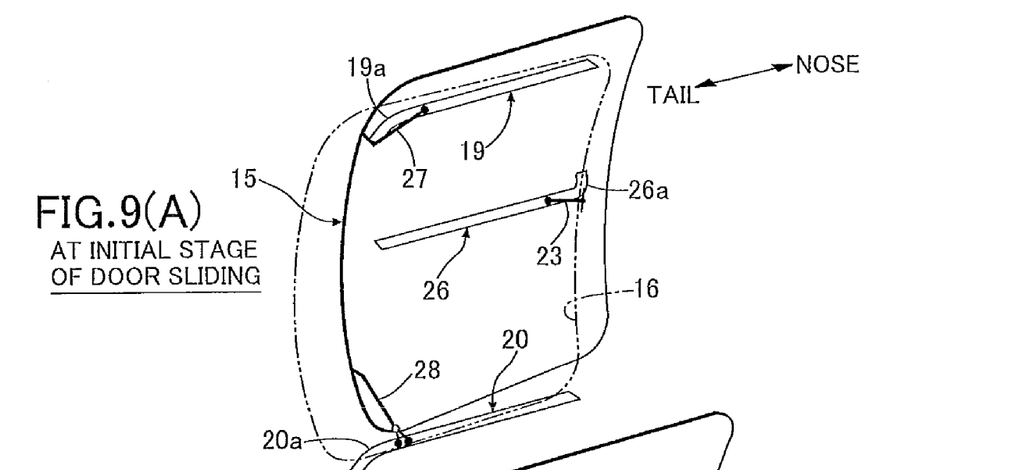
FIGS. 9(A) to 9(C) are views explaining the opening steps of the slide door (Part 2)
Figure 9B:
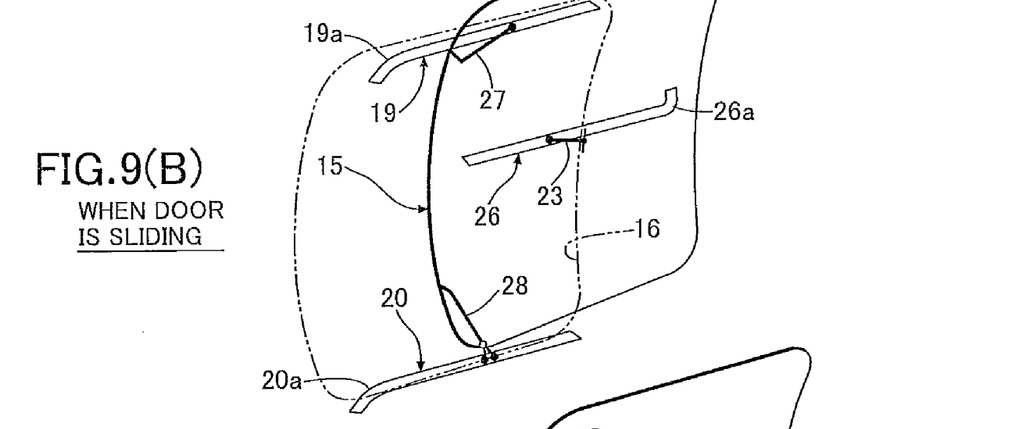
Figure 9C:
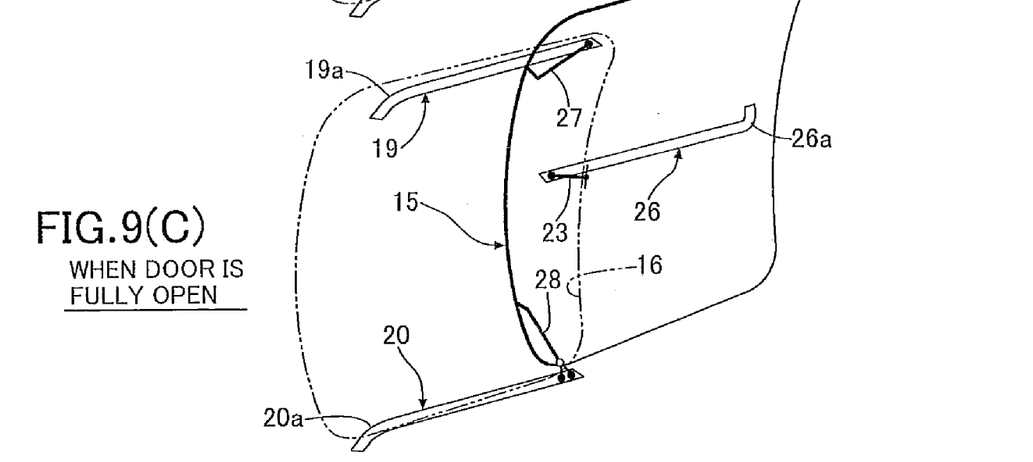
Figure 10A:
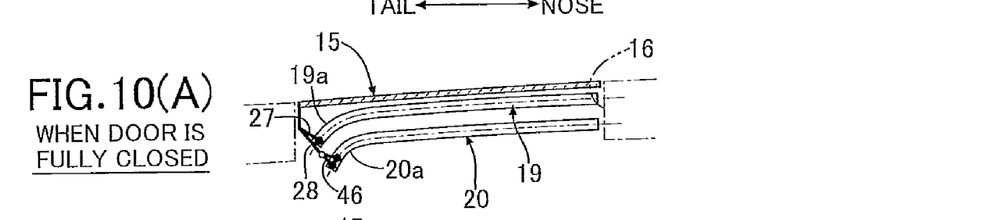
FIGS. 10(A) to 10(F) are views explaining the opening steps of the slide door (Part 3)
Figure 10B:
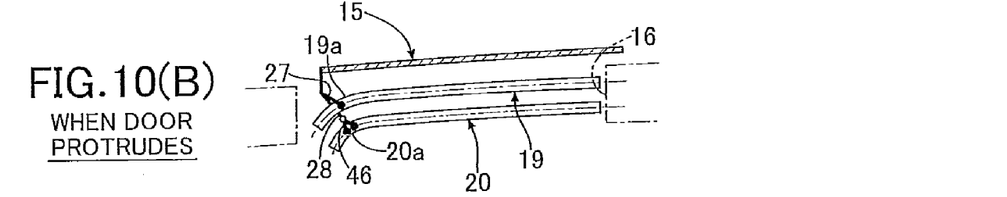
Figure 10C:
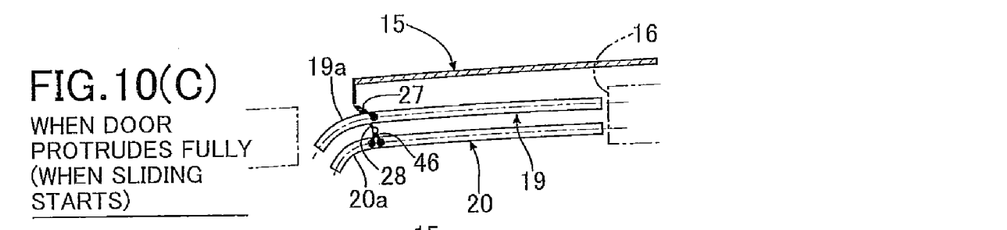
Figures 10D, 10E, 10F:
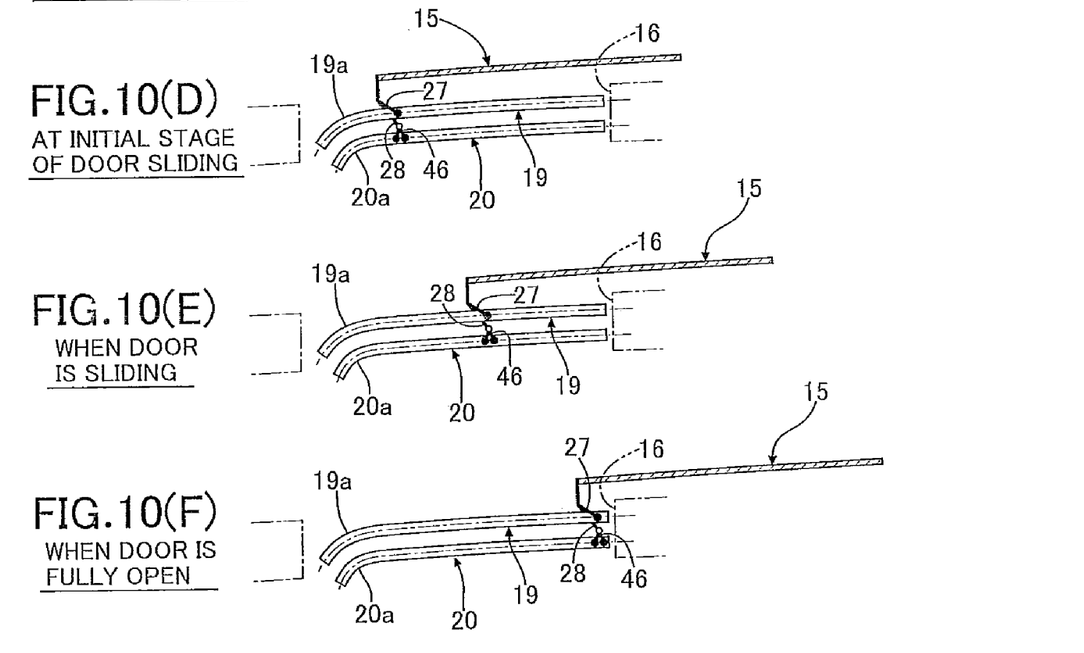

FIG. 7 shows a state in which the slide door 15 is viewed from above. The lower edge line of the door opening 16 is not parallel to the upper edge line of the door opening 16, and is biased in a direction towards the inside of the aircraft body. In particular, the lower edge line of the door opening 16 enters the inside of the aircraft body to a large degree at an end on the tail side, and a distance in the horizontal direction from the upper edge line of the door opening 16 is large at that portion. Since it is undesirable from an aerodynamic viewpoint that the upper guide rail 19 and the lower guide rail 20 project to the outside of the skin of the fuselage 11, it is necessary that the upper guide rail 19 is disposed further on the inner side of the aircraft body than the upper edge line of the door opening 16 and that the lower guide rail 20 is disposed further on the inner side of the aircraft body than the lower edge line of the door opening 16.

In order to allow the slide door 15 to slide smoothly without catching, it is sufficient to make the upper guide rail 19 and the lower guide rail 20 the same shape, and dispose the upper guide rail 19 and the lower guide rail 20 at positions that are shifted in parallel with each other. However, as described above, because the lower edge line of the door opening 16 enters to a large degree into the inside of the aircraft body at the end on the tail side, even if the upper guide rail 19 provided at the upper edge line of the door opening 16 is shifted parallelly downward as it is to form the lower guide rail 20, there is a problem in that the end on the tail side of the lower guide rail 20 will project to the outside of the skin of the fuselage 11 and cause an increase in air resistance and a decrease in reliability. Although it is sufficient to dispose the upper guide rail 19 and the lower guide rail 20 at positions sufficiently inside of the aircraft body from the door opening 16 to avoid this problem, in such a case the problem arises n that the space inside the fuselage 11 is restricted thereby.

The embodiment solves the above-described problems in the following ways.

Figure 11:
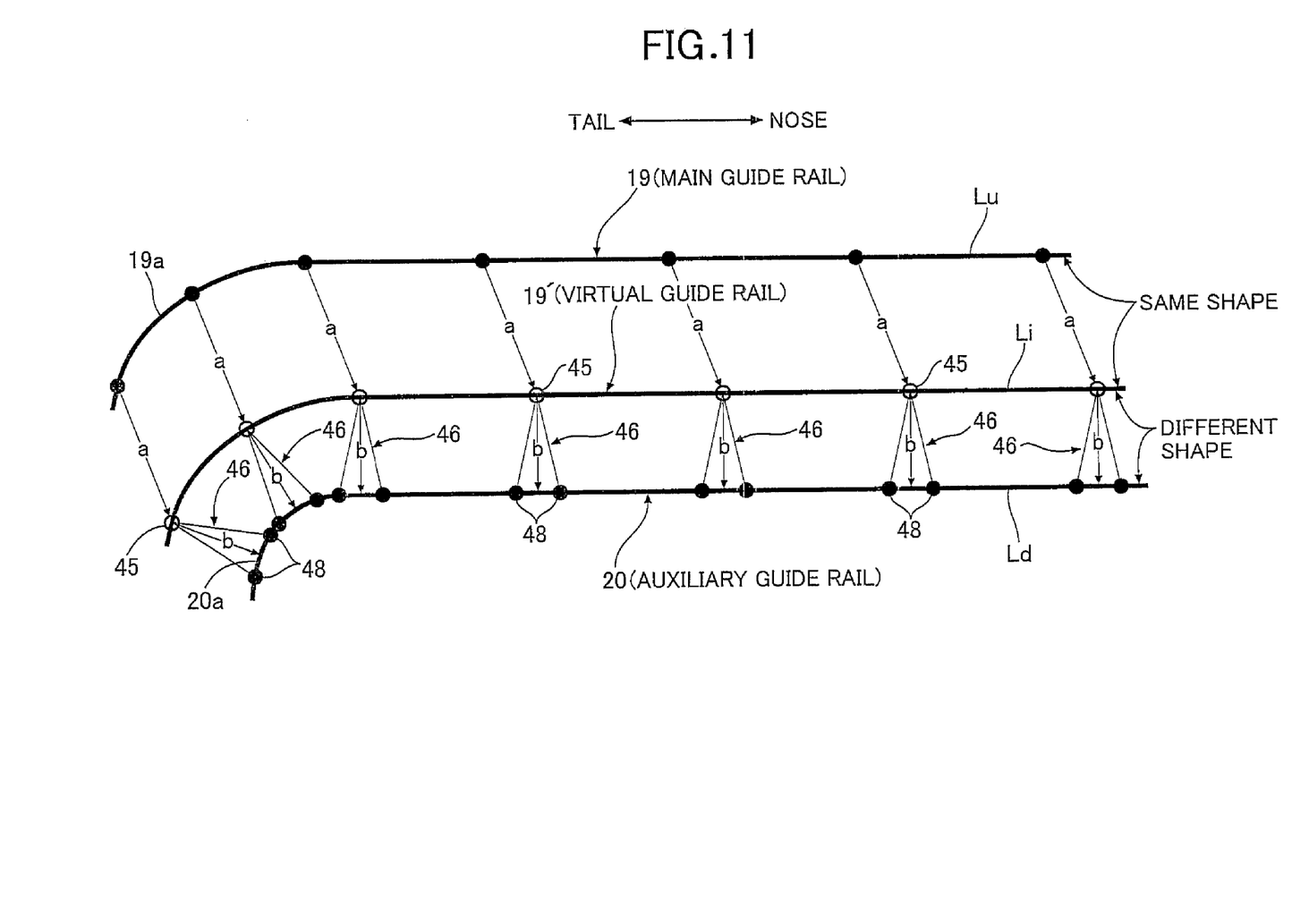
FIG. 11 is a view showing a relationship between upper/lower guide rails and the slide door.

FIG. 11 is a schematic diagram of the upper guide rail 19 (main guide rail) and the lower guide rail 20 (auxiliary guide rail) as viewed from the upper direction. First, a virtual guide rail 19' having an axis Li is set by shifting the upper guide rail 19 having an axis Lu downward and parallel to the direction of the inside of the aircraft body while maintaining the same shape (congruent shape). Since the upper guide rail 19 and the virtual guide rail 19' are guide rails obtained simply by parallelly shifting a guide rail in the same shape, vectors a that connect each corresponding point are all the same.

Two filled dots (●) that move on the lower guide rail 20 having an axis Ld denote the first lower guide rollers 48 and 48 (see FIG. 5). A single unfilled dot (○) that moves on the virtual guide rail 19' denotes the ball joint 45 (see FIG. 5). Since the two first lower guide rollers 48 and 48 and the ball joint 45 are constrained at the vertices of an isosceles triangle by the slider 46 (see FIG. 5), although the sizes of vectors b that connect the middle part of the two first lower guide rollers 48 and 48 from the ball joint 45 are the same, the directions of the vectors b differ. Accordingly, since the lower guide rail 20 is a different shape that is not congruent with the virtual guide rail 19', and the curve part 20a of the lower guide rail 20 curves significantly in comparison to the curve part 19a of the upper guide rail 19, even if the lower guide rail 20 is disposed at a position close to the skin of the fuselage 11, exposure of the lower guide rail 20 to outside of the skin of the fuselage 11 is prevented.

In this case the slider 46 and the lower arm 28 are connected with the ball joint 45. The reason for using the ball joint 45 is to absorb dimensional errors or assembly errors with respect to each part. When there are few dimensional errors or assembly errors, the slider 46 and the lower arm 28 may be connected with a pin joint having an axis in the up-and-down direction.

Thus, it is possible to smoothly open and close the slide door 15 without catching while making the upper guide rail 19 and the lower guide rail 20 different shapes. Furthermore, since it is possible to increase the level of design freedom of a shape of the lower guide rail 20, the lower guide rail 20 can be prevented from interfering with a narrowed down portion on the tail side at the lower part of the fuselage 11. Thus, the formation of projections in the skin of the fuselage 11 can be prevented.

As described in the foregoing, when the shapes of the upper guide rail 19 and the lower guide rail 20 are decided, the movement trajectory of the slide door 15 is also uniquely decided. Therefore, it is sufficient to decide the shape of the intermediate guide rail 26 that is fixed to the inner surface of the slide door 15 such that the first and second intermediate guide rollers 52 and 52, and 54 that are provided in the door opening 16 side can roll smoothly.

An embodiment of the present invention is explained above, but the present invention is not limited to the above-mentioned embodiment and may be modified in a variety of ways as long as the modifications do not depart from the gist of the present invention.

For example, although according to the embodiment the upper guide rail 19 is taken as the main guide rail and the lower guide rail 20 is taken as an auxiliary guide rail, a configuration may be adopted in which this relationship is reversed.

An aircraft according to the present invention is not limited to an airplane, and the present invention can also be applied to a helicopter or airship.

Further, a slider with a low frictional coefficient can be used instead of rollers that guide the sliding of the slide door 15.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A slide door device for an aircraft, the slide door device opening and closing a door opening formed in a fuselage of an aircraft, comprising:
   an upper guide roller at a tip end of an upper arm provided at an upper part of a slide door and a lower guide roller at a tip end of a lower arm provided at a lower part of the slide door, the upper guide roller and the lower guide roller being rollably engaged with an upper guide rail and a lower guide rail that are fixed along an upper edge and a lower edge of the door opening, respectively; and
   an intermediate guide roller provided at a tip end of an intermediate arm provided in the door opening, the intermediate guide roller being rollably engaged with an intermediate guide rail fixed to an inner surface of the slide door.

2. The slide door device for an aircraft according to claim 1, wherein:
   one of the upper guide rail and the lower guide rail is defined as a main guide rail and another of the upper guide rail and the lower guide rail is defined as an auxiliary guide rail, and a virtual guide rail obtained by parallelly shifting the main guide rail in an up-and-down direction;

a slider is pivotally supported through a spindle part at a tip end of an arm which is for the auxiliary guide rail, and a plurality of guide rollers provided in the slider are rollably engaged with the auxiliary guide rail; and a shape of the auxiliary guide rail is set so that, when the plurality of guide rollers provided in the slider are rolled along the auxiliary guide rail, a movement trajectory of the spindle part of the slider matches the virtual guide rail.

3. The slide door device for an aircraft according to claim 1, wherein:

at least one of the upper arm, the lower arm, and the intermediate arm comprises a first guide roller that is rotatably supported around a vertical shaft and a second guide roller that is rotatably supported around a horizontal shaft;

movement of the slide door is guided by the first guide roller;

a weight of the slide door is supported by the second guide roller; and the guide rail which is for said at least one of the arms includes an upper tier and a lower tier, a first groove part in which the first guide roller fits and a second groove part in which the second guide roller fits.

4. The slide door device for an aircraft according to claim 2, wherein:

at least one of the upper arm, the lower arm, and the intermediate arm comprises a first guide roller that is rotatably supported around a vertical shaft and a second guide roller that is rotatably supported around a horizontal shaft;

movement of the slide door is guided by the first guide roller;

a weight of the slide door is supported by the second guide roller; and the guide rail which is for said at least one of the arms includes an upper tier and a lower tier, a first groove part in which the first guide roller fits and a second groove part in which the second guide roller fits.

5. The slide door device for an aircraft according to claim 1, and further including a lever operatively connected to said slide door and manually operated for locking and opening said slide door relative to the aircraft.

6. The slide door device for an aircraft according to claim 1, wherein the upper guide roller is vertically mounted relative to said upper arm for slidably engaging the upper guide rail having a substantially upside down U-shaped structure.

7. The slide door device for an aircraft according to claim 1, wherein the intermediate arm is pivotally supported relative to the fuselage of the aircraft for swinging outwardly relative to the door opening when the slide door device is moved to an opened position.

8. The slide door device for an aircraft according to claim 7, wherein a substantially vertical pin mounts the intermediate arm relative to the fuselage of the aircraft for enabling the swinging of the slide door device relative to the door opening.

9. The slide door device for an aircraft according to claim 1, wherein the upper guide rail extends along an upper portion of the door opening with one end of the upper guide rail being curved inwardly relative to the door opening and the lower guide rail extends along a lower portion of the door opening with one end of the lower guide rail being curved inwardly relative to the door opening for enabling the door to protrude to an outside of the fuselage in an opened position and to be sealed relative to the door opening in a closed position.

10. The slide door device for an aircraft according to claim 9, wherein the lower guide rail is displaced to a larger degree within the fuselage relative to the door opening relative to the upper guide rail wherein the lower guide rail and the upper guide rail are substantially parallel relative to each other.

11. A slide door adapted to open and close a door opening formed in a fuselage of an aircraft, comprising:

an upper arm operatively connected to an upper portion of the slide door;

an upper guide roller rotatably mounted at a tip end of the upper arm;

a lower arm operatively connected to a lower portion of the sliding door;

a lower guide roller rotatably mounted at a tip end of a lower arm;

an upper guide rail and a lower guide rail that are fixed along an inside upper edge and an inside lower edge of the door opening, respectively, said upper guide roller being rollably engaged with the upper guide rail and the lower guide roller being rollably engaged with the lower guide rail;

an intermediate arm operatively connected to the fuselage of the aircraft;

an intermediate guide roller provided at a tip end of the intermediate arm; and an intermediate guide rail fixed to an inner surface of the slide door, said intermediate guide roller being rollably engaged with the intermediate guide.

12. The slide door for an aircraft according to claim 11, wherein:

one of the upper guide rail and the lower guide rail is defined as a main guide rail and another of the upper guide rail and the lower guide rail is defined as an auxiliary guide rail, and a virtual guide rail obtained by parallelly shifting the main guide rail in an up-and-down direction;

a slider is pivotally supported through a spindle part at a tip end of an arm which is for the auxiliary guide rail, and a plurality of guide rollers provided in the slider are rollably engaged with the auxiliary guide rail; and a shape of the auxiliary guide rail is set so that, when the plurality of guide rollers provided in the slider are rolled along the auxiliary guide rail, a movement trajectory of the spindle part of the slider matches the virtual guide rail.

13. The slide door for an aircraft according to claim 11, wherein:

at least one of the upper arm, the lower arm, and the intermediate arm comprises a first guide roller that is rotatably supported around a vertical shaft and a second guide roller that is rotatably supported around a horizontal shaft;

movement of the slide door is guided by the first guide roller;

a weight of the slide door is supported by the second guide roller; and the guide rail which is for said at least one of the arms includes an upper tier and a lower tier, a first groove part in which the first guide roller fits and a second groove part in which the second guide roller fits.

14. The slide door for an aircraft according to claim 12, wherein:

at least one of the upper arm, the lower arm, and the intermediate arm comprises a first guide roller that is rotatably supported around a vertical shaft and a second guide roller that is rotatably supported around a horizontal shaft;

movement of the slide door is guided by the first guide roller;

a weight of the slide door is supported by the second guide roller; and the guide rail which is for said at least one of the arms includes an upper tier and a lower tier, a first groove part in which the first guide roller fits and a second groove part in which the second guide roller fits.

15. The slide door for an aircraft according to claim 11, and further including a lever operatively connected to said slide door and manually operated for locking and opening said slide door relative to the aircraft.

16. The slide door for an aircraft according to claim 11, wherein the upper guide roller is vertically mounted relative to said upper arm for slidably engaging the upper guide rail having a substantially upside down U-shaped structure.

17. The slide door for an aircraft according to claim 11, wherein the intermediate arm is pivotally supported relative to the fuselage of the aircraft for swinging outwardly relative to the door opening when the slide door device is moved to an opened position.

18. The slide door for an aircraft according to claim 17, wherein a substantially vertical pin mounts the intermediate arm relative to the fuselage of the aircraft for enabling the swinging of the slide door device relative to the door opening.

19. The slide door for an aircraft according to claim 11, wherein the upper guide rail extends along an upper portion of the door opening with one end of the upper guide rail being curved inwardly relative to the door opening and the lower guide rail extends along a lower portion of the door opening with one end of the lower guide rail being curved inwardly relative to the door opening for enabling the door to protrude to an outside of the fuselage in an opened position and to be sealed relative to the door opening in a closed position.

20. The slide door for an aircraft according to claim 19, wherein the lower guide rail is displaced to a larger degree within the fuselage relative to the door opening relative to the upper guide rail wherein the lower guide rail and the upper guide rail are substantially parallel relative to each other.

* * * * *